July 1, 1924.

E. E. LANDAHL ET AL

CONVEYING APPARATUS

Filed Sept. 2, 1921

Inventors
Eugene E. Landahl,
Corwin S. Jones,

Patented July 1, 1924.

1,499,832

UNITED STATES PATENT OFFICE.

EUGENE E. LANDAHL, OF OAK PARK, AND CORWIN S. JONES, OF MAYWOOD, ILLINOIS, ASSIGNORS TO THE WEBSTER MANUFACTURING COMPANY, OF CHICAGO, ILLINOIS, A CORPORATION OF OHIO.

CONVEYING APPARATUS.

Application filed September 2, 1921. Serial No. 497,952.

*To all whom it may concern:*

Be it known that we, EUGENE E. LANDAHL and CORWIN S. JONES, citizens of the United States, residing at Oak Park and Maywood, respectively, county of Cook, and State of Illinois, have invented certain new and useful Improvements in Conveying Apparatus; and we do hereby declare the following to be a full, clear, and exact description of the invention, such as will enable others skilled in the art to which it appertains to make and use the same.

This invention relates to improvements in conveying apparatus; and more particularly to improvements in what is known as belt conveyor apparatus, wherein an endless flexible conveyor member, such as a belt, is caused to pass over so-called troughing-rolls which cause the upper surface of the flexible conveyor member to become concave or trough-shaped for reception and transport of materials fed thereto, a lower set of rolls serving to support the lower pass of said conveyor member as it returns idle to the starting point.

For best results, it is desirable in apparatus of this general character that the belt or other flexible conveyor member be supported by the troughing rolls in such manner that the belt will run with uniformity and smoothness at all times and not jump or pull away from the supporting rolls, thereby not only enabling it to carry a maximum load of material, but also reducing wear on the belt to a minimum.

Accordingly, it is a principal object of the present invention to provide means for supporting a belt or other flexible conveyor so that the belt will run true and will not jump or pull away from the supporting rolls.

Another object of our invention is to provide an extremely simple, yet rugged construction, in which some of the parts are standardized so that the number of different parts required is greatly reduced.

Other objects and advantages will be clear from the following description.

Broadly stated, our improved apparatus is characterized by a series of belt-supporting and guiding rolls arranged in sets at intervals to support and guide a belt or other flexible conveyor member, the sets of belt-supporting and guiding rolls being readily adjustable about an axis extending transversely of the belt so that the belt will run at all times with uniformity and smoothness and be maintained in contact with the guiding and supporting rolls.

More specifically described, our apparatus comprises a plurality of belt-supporting and guiding rolls arranged in sets at intervals to support and guide a belt, each set being supported on a frame, each frame being mounted on adjusting brackets which permit the frames to be swung on an axis which is transverse to the belt. The rolls are mounted on brackets carried by the supporting frames. The roll-supporting brackets, supporting frames, and adjusting brackets carrying the supporting frames are, respectively, standard and interchangeable.

The accompanying drawings illustrate apparatus embodying the principles of our invention, but it is to be understood that the specific embodiment here chosen for purposes of illustration is merely typical of apparatus contemplated by the invention and included within the scope of the appended claims.

In the drawings, Fig. 1 is a partial transverse sectional view of conveyor apparatus embodying our invention, only one-half of the apparatus, as cut on the longitudinal center line, being shown, the other half being a duplicate of that part shown;

Figure 1:
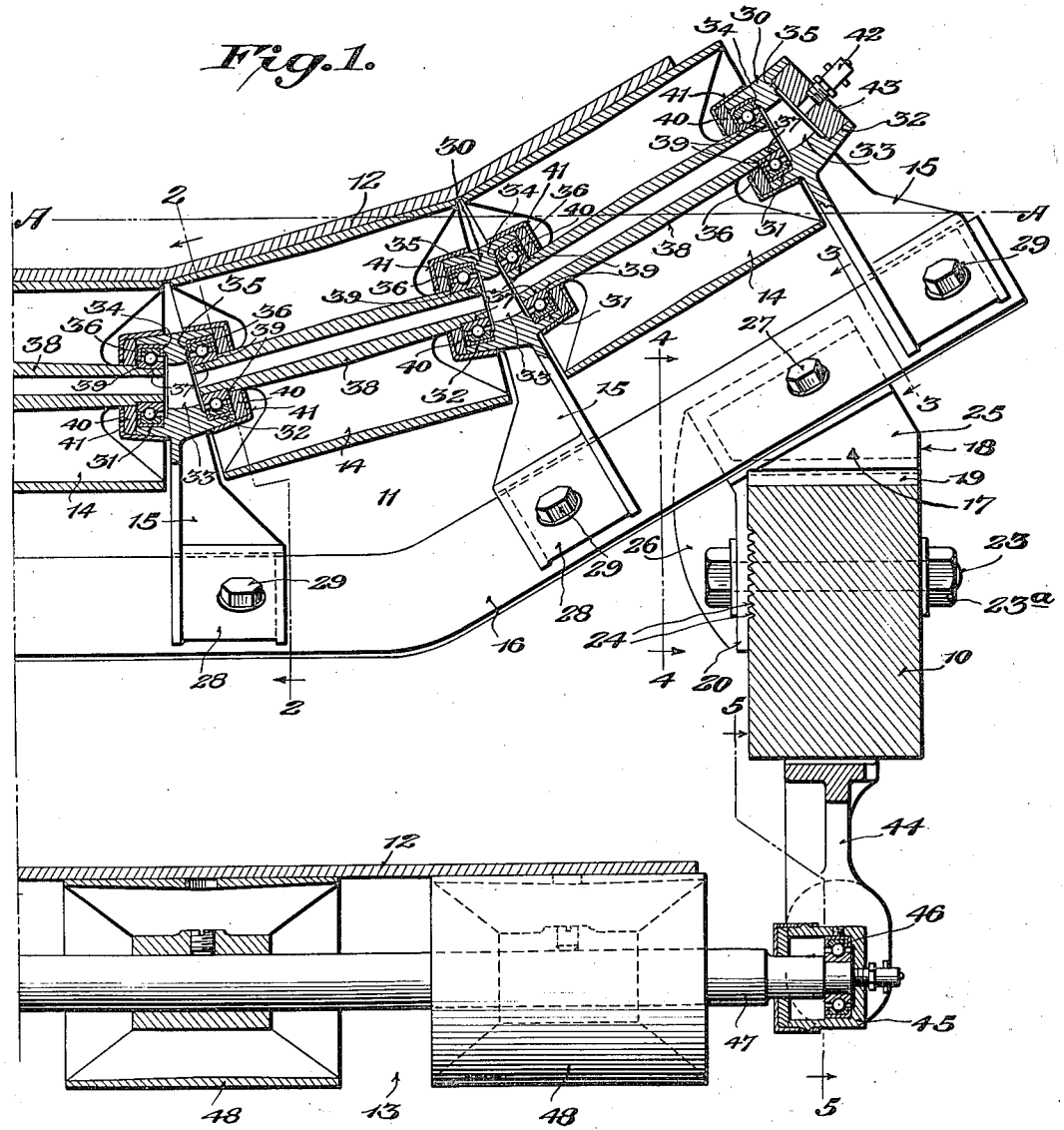
Figure 2:
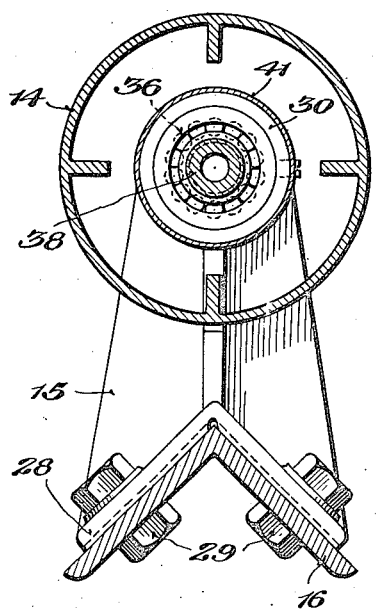
Fig. 2 is an enlarged section on the line 2—2 of Fig. 1 looking in the direction of the arrows 2—2.
Figure 3:
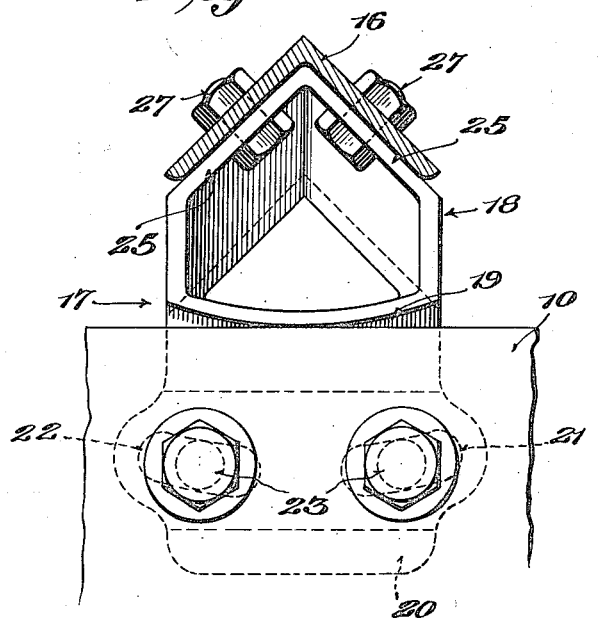
Fig. 3 is an enlarged section on the line 3—3 of Fig. 1 looking in the direction of the arrows 3—3.
Figure 4:
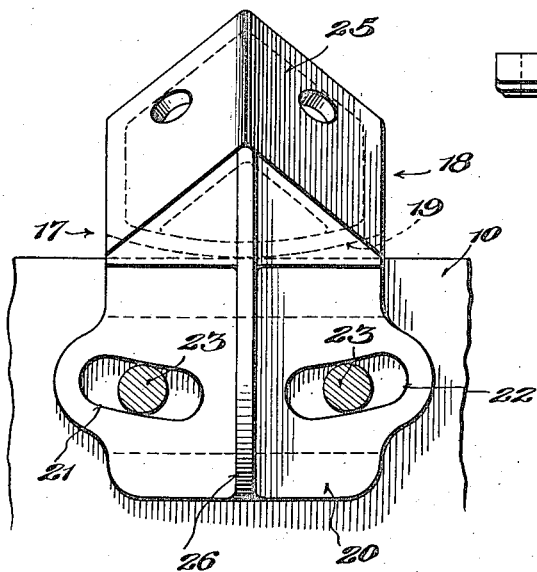
Figure 5:
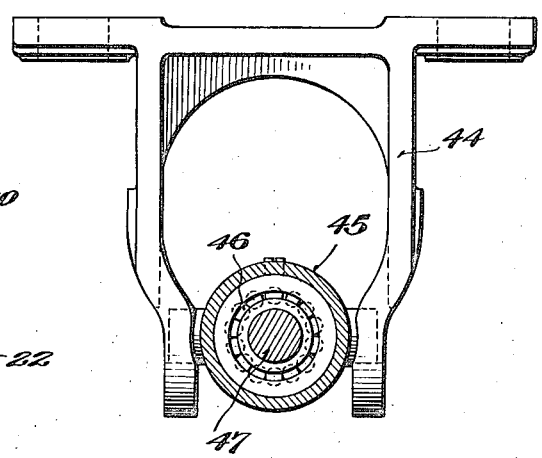

Fig. 4 is an enlarged view in elevation of one of the adjusting brackets looking in the direction of the arrows 4—4 of Fig. 1, the bolts being shown in section and a portion of the supporting framework being shown; and Fig. 5 is an enlarged view, partially in section, on the line 5—5 of Fig. 1, looking in the direction of the arrows 5—5.

Referring to the drawings, 10 indicates one of the side members of a suitable supporting framework upon which the conveyor parts are mounted, 11 indicates generally one of a plurality of carrier structures which are placed at intervals on the supporting framework and cooperate to support the upper run of the endless belt or other endless flexible conveyor member 12 in the form of a trough; and 13 indicates generally one of a plurality of return carrier structures which are placed at intervals on the supporting structure to support the lower run of the belt as it returns idle to the starting point. Each of the upper or troughing-roll carrier structures 11 comprises the troughing-rolls or pulleys 14, supported by the stands or brackets 15 mounted on the supporting frame or cradle 16, which in turn is supported at its opposite ends by the adjusting brackets indicated generally at 17, secured to the framework 10, only one of said adjusting brackets being shown in Fig. 1.

One of the important features of our invention resides in the fact that the troughing-rolls of each of the upper carrier structures are mounted on or supported by a common frame and are adjustable as a unit. The adjusting brackets 17, two of which support each supporting frame or cradle 16 in the present instance, as stated, provide the means for adjusting the troughing-rolls. Each of the adjusting brackets, indicated generally by 17, comprises a body portion 18 having a rounded base or bearing surface 19 which rests on the upper flat surface of the framework. Depending from one side of the body is an arm or extension 20 which engages a side of the supporting framework 10. This arm is provided with arcuate slots 21 and 22 to receive bolts 23 which secure the bracket to the framework and hold it in any adjusted position. The arc of the slots 21 and 22 is concentric with the arcuate base or bearing surface 19 of the bracket in order to permit the bracket to freely slide on the base 19, allowing the bracket to swing about an axis located at the center of the arc of the arcuate base of the bracket, indicated as being approximately on the line A—A of Fig. 1, for the purpose of adjusting the position of the bracket when the bolts are loosened for this purpose. If desired, the surface of the arm 20 which engages the side of the framework 10 may be roughened or provided with spurs 24 to prevent the bracket from accidentally slipping after it has been adjusted and the nuts 23ª tightened. The upper part 25 of the body 18 of the bracket 17, opposite the arcuate base 19 receives and supports one end of one of the supporting frames or troughers 16. In the present instance, this top or upper portion 25 of each of the brackets 17 is convex in shape and inclined transversely with respect to the arcuate base, being inverted V-shape in vertical section. The lower end of the inclined convex top 25 overhangs the arm 20 of the bracket and is connected therewith by a reinforcing web 26.

The supporting frames or cradles 16 supported by the adjusting brackets 17 each comprise a unitary bar, curved or bent to form a substantially trough-shaped frame or trougher. While it is obvious that the bar may be troughed or curved in any desired shape, in the present instance the bar has two bends forming a frame having a central horizontal portion and two upwardly inclined lateral portions. We prefer an angular bar, inverted V-shape in cross section, not only because of the added strength of such a construction, but because when the bar is arranged with the vertex of the angle at the top, it will readily shed any material which may be spilled on it from the belt as it is being conveyed. Other advantages of this construction will appear as the description proceeds. The manner in which each frame or trougher 16 is supported by two of the adjusting brackets 17 in the present example of our invention is apparent from the drawings. The frames rest on the inclined convex tops of the brackets and are held in engagement therewith by pairs of bolts or other suitable fastening means 27. By reason of the interlocking engagement of the complementary angular engaging surfaces of the frames and adjusting brackets, the frames are securely supported; and furthermore, either end of any frame will be held securely even by one bolt alone in case the other bolt of the pair should become loosened.

Mounted on the supporting frames or cradles 16 are the troughing-roll supporting brackets indicated generally by 15. These brackets are so disposed on the supporting frames or cradles as to support between them the several troughing-rolls or pulleys that support the belt or other flexible conveyor member. Any desired number of troughing-rolls may be used. The number, size and disposition of the brackets will, of course, vary with the size and number of pulleys used. Each bracket has a bifurcated base portion 28 which straddles the inverted V-shaped angle-bar frame 16 when the roll-supporting brackets are secured to the frames. These brackets are held in place by bolts or other fastening means 29. It is to be observed that, because of the interlocking engagement of the complementary angular engaging surfaces of the frames and roll-supporting brackets, these brackets are very solidly and securely supported, and that even if one of the two bolts which secure each of the brackets should become loosened, the bracket would still be rigidly held in place. In the construction here shown, each of the brackets is provided at the portion opposite the base with a hollow bearing-holder or housing 30. Each of the bearing-holders or housings 30 comprises two end chambers 31 and 32, connected by a reduced passage 33 thereby forming a continuous hollow passageway through the bearing-holders having limiting shoulders or abutments 34 and 35 at the junction of the reduced passage with the end chambers. The chambers 31 and 32 of each of the hollow bearing-holders or housings 30, are adapted to receive ball-bearings 36, which abut the limiting shoulders or abutments 34 or 35 as the case may be. Each ball-bearing is adapted to receive and rotatably support one of the end portions 37 of the hollow hub 38 of one of the troughing rolls 14. In the example illustrated, the ends of each hub are reduced to form limiting shoulders 39 adjacent each hub end. Each bearing is provided with a washer 40 of felt or other suitable material and a dust cap 41. When the apparatus is assembled, the brackets are arranged on the supporting frames so as to support between them the troughing-rolls, each of the reduced ends 37 of the hollow hub 38 of each troughing roll engaging in a ball-bearing 36, and the shoulders 39 on the hub preventing the hub from sliding through the bearing. With the exception of the brackets at the ends of each supporting frame, each bracket supports two ends of a troughing roll, so that a continuous passageway through the alined hollow troughing-roll hubs and their supporting bearing is formed. This passageway forms a means of supplying lubricant to the chambers of the bearing holders or housings in which the ball-bearings are located, thereby insuring adequate lubrication of all moving parts. A suitable lubricant is supplied through oilers 42 or other lubricant supplying means mounted in plugs 43 supported in the chambers in the outside ends of the brackets at opposite ends of each supporting frame, the lubricant passing through the alined hollow hubs of the troughing rolls and the supporting bearings.

It will be seen that each set of troughing-rolls is supported as a unit on a common supporting frame and that each set may be adjusted as a unit. It has been found in practice that, if the horizontal pulley be set or adjusted slightly in advance of the inclined rolls or pulleys, the belt will stay on the pulleys much better and not jump or pull away from them. As previously described, in adjusting a troughing-roll unit of the typical construction here illustrated, the adjusting brackets 17 swing about an axis extending transversely of the conveyor belt. This axis passes through the centers of the arcs of the arcuate bases of the adjusting brackets and in Fig. 1 of the drawings the axis is located approximately on the line A—A. As shown in Fig. 1, it will be observed that the central horizontal troughing-roll is supported below the axis of swing and that the two inclined rolls (only one of which is shown) immediately adjacent the central horizontal roll on either side thereof are also supported below, but nearer to, the axis of swing while the two outside inclined troughing-rolls (only one of which is shown) are slightly above the axis of swing. It is clear, therefore, in the construction described, that by sliding the adjusting brackets forward on their curved bases, the troughing-roll unit may be adjusted to place the horizontal or central part of the unit slightly in advance of the inclined lateral parts. While we have described in detail one desirable embodiment of adjusting means it is to be understood that we are not limited to the arrangement and construction shown.

It is apparent from the foregoing that the number of different parts required to construct our apparatus is unusually small, due to the fact that we have standardized the construction of the various parts. While simplicity is a feature of our invention, it will be observed also that we have so connected the various parts as to produce an exceedingly sturdy structure when the parts are assembled.

The return idler structure, heretofore referred to as indicated generally by 13, comprises hangers 44, attached to the supporting framework, carrying oscillating bearing-holders 45, in which are secured ball-bearings 46 which rotatably support shafts 47 carrying idler rolls 48. These structures are arranged at intervals along the framework to support the returning belt.

While we have shown and described our improved conveying apparatus in detail, it is to be understood that various features thereof may be modified without departing from the spirit and scope of the invention.

What we claim is:

1. Conveying apparatus comprising the combination with a belt, of a troughing-roll unit mounted in a plane transverse to said belt for troughing and guiding said belt, said unit comprising a substantially central horizontal roll and upwardly inclined lateral rolls and adjustable supporting and positioning means whereby said central roll may be bodily moved forwardly relative to said lateral rolls in the direction of travel of said belt to adjustably position said central roll in advance of said lateral rolls.

2. Conveying apparatus comprising the combination with a belt, of a troughing-roll unit mounted in a plane transverse to said belt for troughing and guiding said belt, said unit comprising a substantially central horizontal roll and upwardly inclined lateral rolls and adjustable supporting means whereby said troughing-roll unit may be swung about an axis transverse to said belt and forwardly in the direction of travel of said belt to position said central roll of said unit in advance of said lateral rolls.

3. Conveying apparatus comprising the combination with a belt, of a troughing-roll unit mounted in a plane transverse to said belt for troughing and guiding said belt, said unit comprising a substantially central horizontal roll and lateral rolls upwardly inclined from said central roll, and adjustable supporting means whereby said troughing-roll unit may be swung about an axis transverse to said belt and above the axis of said central roll.

4. Conveying apparatus comprising the combination with a belt, of a troughing-roll unit mounted in a plane transverse to said belt for troughing and guiding said belt, said unit comprising a substantially central horizontal roll and upwardly inclined lateral rolls and adjustable supporting and positioning means whereby said troughing-roll unit may be swung about an axis intersecting the axes of said lateral rolls and above the axis of said central roll and transverse to said belt.

5. Conveying apparatus comprising the combination with a belt, of a supporting frame, a set of troughing rolls mounted on said frame, said set comprising an intermediate substantially horizontal roll and upwardly inclined side rolls and means supporting said frame at points below the axis of said intermediate roll and adjustable to swing said frame about an axis transverse to said belt and above the axis of said intermediate roll.

6. Conveying apparatus comprising the combination with a belt, of an integral trough-shaped supporting frame, a plurality of brackets carried by said frame, said brackets being substantially similar in shape, belt-supporting rolls carried by said brackets and adjustable supporting means whereby said frame may be swung about an axis which is transverse to the belt.

7. Conveying apparatus comprising the combination with a belt, of a plurality of rolls extending as a set transversely of said belt, said set comprising an intermediate roll and side rolls all in supporting and guiding relation to said belt, and adjustable supporting and positioning means for said rolls whereby said intermediate roll may be bodily adjusted forwardly relative to said side rolls in the direction of travel of said belt to adjustably position said intermediate roll in advance of said side rolls.

8. Conveying apparatus comprising a plurality of belt supporting and troughing rolls arranged in sets at intervals to support and trough a belt, brackets for supporting said rolls, supporting frames on which said brackets are mounted and adjustable supporting means whereby said frames may be swung, respectively, about axes extending transversely of the belt and above the axes of the lowermost rolls of said sets.

9. Conveying apparatus comprising a supporting frame comprising an angle bar inverted V-shape in cross-section, brackets mounted on said supporting frame having bifurcated bases which straddle said supporting frame, troughing rolls supported by said brackets and means for swingably supporting said frame.

10. Conveyor apparatus comprising a supporting frame, brackets mounted on said supporting frame, said brackets being provided with bearing housings, ball-bearings mounted in said housings, troughing rolls provided with hollow hubs supported in said bearings, means for supplying a lubricant to the bearings through said hollow hubs and means for swingably supporting said supporting frame.

11. Conveyor apparatus comprising a supporting frame, troughing rolls carried by said supporting frame, and brackets provided with rounded supporting bases for supporting said supporting frame.

12. Conveyor apparatus comprising a supporting frame, troughing rolls carried by said supporting frame, brackets provided with rounded supporting bases for adjustably supporting said supporting frame and means for securing said brackets in adjusted positions.

13. Conveyor apparatus comprising a supporting frame comprising a trough-shaped angle bar, troughing-rolls carried by said supporting frame, brackets for adjustably supporting said supporting frame, said brackets having convex inclined tops engaging and interlocking with said supporting frame and being provided with rounded supporting bases for adjustably supporting said supporting frame, and means for securing said brackets in adjusted positions.

14. Conveying apparatus comprising a supporting frame comprising a bar, angular in cross-section, brackets mounted on said supporting frame having bases which straddle said supporting frame and troughing-rolls supported by said brackets.

15. Conveying apparatus comprising a supporting frame comprising a bar, inverted V-shape in cross-section, brackets mounted on said supporting frame having bifurcated bases which straddle said supporting frame, troughing-rolls supported by said brackets and means for supporting said supporting frame.

16. Conveying apparatus comprising a supporting frame comprising an integral trough-shaped bar, inverted V-shape in cross-section, brackets mounted on said supporting frame having bifurcated bases which straddle said supporting frame, troughing-rolls supported by said brackets and means for swingably supporting said supporting frame.

17. Conveying apparatus comprising the combination with a flexible conveyor member of a troughing-roll unit for supporting said conveyor member, said unit comprising an intermediate substantially horizontal roll and upwardly inclined side rolls swingably supported about an axis extending transversely of the conveyor member and above the axis of said intermediate roll.

18. Conveying apparatus comprising the combination with a flexible conveyor member of a troughing-roll unit for supporting said conveyor member comprising, a central horizontal roll and inclined lateral rolls swingably supported about an axis extending transversely of the conveyor member, the central horizontal roll being supported a greater distance from said axis than the inclined lateral rolls.

19. Conveying apparatus comprising the combination with a flexible conveyor member of a troughing-roll unit for supporting said conveyor member comprising a plurality of troughing-rolls swingably supported in a common plane about an axis extending transversely of the conveyor member, a part of said rolls being supported on one side of the axis and the others supported on the other side of the axis.

20. Conveying apparatus comprising a supporting frame, brackets mounted on said supporting frame, said brackets being provided with bearing housings, ball-bearings mounted in said housings, and troughing-rolls provided with hubs, said hubs extending into and supported by said bearings.

21. Conveying apparatus comprising a supporting frame, brackets mounted on said supporting frame, said brackets being provided with bearing housings, ball-bearings mounted in said housings, troughing-rolls provided with hollow hubs, said hubs extending into and supported by said bearings, and means for supplying a lubricant to the bearings through said hollow hubs.

In testimony whereof we hereunto affix our signatures.

EUGENE E. LANDAHL.
CORWIN S. JONES.